(12) United States Patent
Thibadeau (10) Patent No.: US 7,925,894 B2
(45) Date of Patent: Apr. 12, 2011

(54) SYSTEM AND METHOD FOR DELIVERING VERSATILE SECURITY, DIGITAL RIGHTS MANAGEMENT, AND PRIVACY SERVICES

(75) Inventor: Robert Harwell Thibadeau, Pittsburgh, PA (US)

(73) Assignee: Seagate Technology LLC, Scotts Valley, CA (US)

( * ) Notice: Subject to any disclaimer, the term of this patent is extended or adjusted under 35 U.S.C. 154(b) by 1623 days.

(21) Appl. No.: 10/984,368

(22) Filed: Nov. 9, 2004

(65) Prior Publication Data

US 2005/0160281 A1   Jul. 21, 2005

Related U.S. Application Data

(63) Continuation-in-part of application No. 10/963,373, filed on Oct. 12, 2004, now abandoned, which is a continuation-in-part of application No. 09/912,931, filed on Jul. 25, 2001, now Pat. No. 7,036,020.

(51) Int. Cl.
*G06F 12/14* (2006.01)
(52) U.S. Cl. .......................... 713/193; 713/189; 380/277
(58) Field of Classification Search .................. None
See application file for complete search history.

(56) References Cited

U.S. PATENT DOCUMENTS

| | | | |
|---|---|---|---|
| 3,576,544 A | 4/1971 | Cordero, Jr. et al. | 340/172.5 |
| 3,890,601 A | 6/1975 | Pietrolewicz | 340/172.5 |
| 4,183,085 A | 1/1980 | Roberts et al. | 364/200 |
| 4,442,484 A | 4/1984 | Childs, Jr. et al. | 364/200 |
| 4,593,384 A | 6/1986 | Kleijne | |
| 5,012,514 A | 4/1991 | Renton | |
| 5,022,077 A | 6/1991 | Bealkowski et al. | 380/4 |
| 5,027,401 A | 6/1991 | Soltesz | 713/200 |
| 5,101,374 A | 3/1992 | Sinutko, Jr. | 713/200 |
| 5,164,988 A | 11/1992 | Matyas et al. | |
| 5,345,590 A | 9/1994 | Ault et al. | 395/650 |
| 5,394,469 A | 2/1995 | Nagel et al. | 705/53 |
| 5,432,939 A | 7/1995 | Blackledge et al. | 713/200 |
| 5,448,045 A | 9/1995 | Clark | 235/382 |
| 5,504,814 A | 4/1996 | Miyahara | |
| 5,600,805 A | 2/1997 | Fredericks et al. | |
| 5,623,637 A | 4/1997 | Jones et al. | 395/491 |
| 5,754,821 A | 5/1998 | Cripe et al. | 395/491 |
| 5,787,498 A | 7/1998 | Lee et al. | |
| 5,809,546 A | 9/1998 | Greenstein et al. | |

(Continued)

FOREIGN PATENT DOCUMENTS

CN        1567362 A        1/2005

(Continued)

OTHER PUBLICATIONS

International Search Report.

(Continued)

*Primary Examiner* — Pramila Parthasarathy
(74) *Attorney, Agent, or Firm* — Theodore M. Magee; Westman, Champlin & Kelly, P.A.

(57) ABSTRACT

A method for providing enhanced security features in a storage device involves partitioning a storage media in the storage device into a hidden partition and a storage partition in the storage media. A base class is written to the hidden partition. A security provider base class is instantiated from the base class. The security provider base class is adapted to control access to the storage media.

22 Claims, 7 Drawing Sheets

U.S. PATENT DOCUMENTS

| | | | |
|---|---|---|---|
| 5,815,665 A | 9/1998 | Teper et al. | |
| 5,889,941 A | 3/1999 | Tushie et al. | 713/200 |
| 5,892,899 A | 4/1999 | Aucsmith et al. | 713/200 |
| 5,892,902 A | 4/1999 | Clark | 395/187.01 |
| 5,928,364 A | 7/1999 | Yamamoto | 713/202 |
| 5,940,513 A | 8/1999 | Aucsmith et al. | 713/187 |
| 5,949,601 A | 9/1999 | Braithwaite et al. | 360/60 |
| 6,000,023 A | 12/1999 | Jeon | |
| 6,044,349 A | 3/2000 | Tolopka et al. | 705/1 |
| 6,061,449 A | 5/2000 | Candelore et al. | |
| 6,088,802 A | 7/2000 | Bialick et al. | |
| 6,092,202 A | 7/2000 | Veil et al. | 713/201 |
| 6,134,662 A | 10/2000 | Levy et al. | 713/200 |
| 6,138,239 A | 10/2000 | Veil | 713/200 |
| 6,141,752 A | 10/2000 | Dancs et al. | 713/172 |
| 6,157,984 A | 12/2000 | Fisher et al. | 711/112 |
| 6,173,282 B1 | 1/2001 | McCaghaun et al. | |
| 6,173,402 B1 | 1/2001 | Chapman | |
| 6,175,924 B1 | 1/2001 | Arnold | |
| 6,182,222 B1 | 1/2001 | Oparaji | |
| 6,192,472 B1 | 2/2001 | Garay et al. | |
| 6,219,726 B1 | 4/2001 | Ripberger | 710/36 |
| 6,219,771 B1 | 4/2001 | Kikuchi et al. | 711/164 |
| 6,226,744 B1 | 5/2001 | Murphy et al. | |
| 6,253,281 B1 | 6/2001 | Hall | 711/112 |
| 6,268,789 B1 | 7/2001 | Diamant et al. | 340/5.74 |
| 6,269,409 B1 | 7/2001 | Solomon | |
| 6,321,358 B1 | 11/2001 | Anderson | 714/763 |
| 6,324,627 B1 | 11/2001 | Krichegg et al. | 711/163 |
| 6,330,653 B1 | 12/2001 | Murray et al. | |
| 6,336,187 B1 | 1/2002 | Kern et al. | |
| 6,360,945 B1 * | 3/2002 | Drew | 235/382 |
| 6,421,779 B1 | 7/2002 | Kuroda et al. | |
| 6,438,690 B1 | 8/2002 | Patel et al. | |
| 6,446,209 B2 | 9/2002 | Kern et al. | 713/193 |
| 6,468,160 B2 | 10/2002 | Eliott | |
| 6,647,481 B1 | 11/2003 | Luu et al. | |
| 6,650,492 B2 | 11/2003 | Lenny et al. | 360/31 |
| 6,691,198 B1 | 2/2004 | Hamlin | 710/305 |
| 6,691,226 B1 | 2/2004 | Frank, Jr. et al. | |
| 6,707,548 B2 | 3/2004 | Kreimer et al. | |
| 6,711,605 B2 | 3/2004 | Sekiguchi et al. | |
| 6,715,073 B1 | 3/2004 | An et al. | |
| 6,820,063 B1 | 11/2004 | England et al. | |
| 6,836,853 B1 | 12/2004 | Dover et al. | |
| 6,854,039 B1 | 2/2005 | Strongin et al. | |
| 6,871,278 B1 | 3/2005 | Sciupac | |
| 6,889,329 B1 | 5/2005 | DiGiorgio et al. | |
| 6,892,383 B1 | 5/2005 | Arndt | |
| 6,915,402 B2 | 7/2005 | Wilson et al. | |
| 6,957,364 B2 | 10/2005 | Shimooka et al. | |
| 6,986,052 B1 | 1/2006 | Mittal | |
| 7,036,020 B2 | 4/2006 | Thibadeau | |
| 7,046,805 B2 | 5/2006 | Fitzhardinge et al. | |
| 7,085,931 B1 | 8/2006 | Smith et al. | |
| 7,114,051 B2 | 9/2006 | Guu et al. | |
| 7,124,301 B1 * | 10/2006 | Uchida | 713/189 |
| 7,155,616 B1 * | 12/2006 | Hamlin | 713/193 |
| 7,178,034 B2 | 2/2007 | Cihula et al. | |
| 7,228,243 B2 | 6/2007 | Brenner | |
| 7,336,789 B1 | 2/2008 | Mooij et al. | |
| 7,356,665 B2 | 4/2008 | Rawson, III | |
| 7,426,747 B2 | 9/2008 | Thibadeau | |
| 7,461,270 B2 | 12/2008 | Thibadeau | |
| 7,539,890 B2 | 5/2009 | Thibadeau | |
| 7,600,129 B2 | 10/2009 | Libin et al. | |
| 2001/0052073 A1 | 12/2001 | Kem et al. | |
| 2002/0069169 A1 | 6/2002 | Sukeda et al. | |
| 2002/0077177 A1 | 6/2002 | Elliot | 463/40 |
| 2002/0108051 A1 | 8/2002 | Fougeroux et al. | |
| 2002/0136406 A1 | 9/2002 | Fitzhardinge et al. | 380/210 |
| 2002/0157010 A1 * | 10/2002 | Dayan et al. | 713/191 |
| 2002/0178337 A1 | 11/2002 | Wilson et al. | |
| 2003/0023867 A1 | 1/2003 | Thibadeau | 713/200 |
| 2003/0046472 A1 | 3/2003 | Morrow | |
| 2003/0084168 A1 | 5/2003 | Erickson et al. | |
| 2003/0225960 A1 | 12/2003 | Guu et al. | |
| 2004/0073795 A1 | 4/2004 | Jablon | 713/171 |
| 2004/0088513 A1 | 5/2004 | Biessener et al. | |
| 2004/0128500 A1 | 7/2004 | Cihula et al. | |
| 2005/0066191 A1 | 3/2005 | Thibadeau | |
| 2005/0160151 A1 | 7/2005 | Rawson, III | |
| 2005/0177698 A1 | 8/2005 | Ku et al. | |
| 2005/0177714 A1 | 8/2005 | Jeong et al. | 713/155 |
| 2005/0197859 A1 | 9/2005 | Wilson et al. | |
| 2005/0210266 A1 | 9/2005 | Cottrell et al. | 713/185 |
| 2005/0268114 A1 | 12/2005 | Thibadeau | |
| 2006/0174352 A1 | 8/2006 | Thibadeau | |
| 2007/0174920 A1 | 7/2007 | Thibadeau | |
| 2007/0250710 A1 | 10/2007 | Thibadeau | |
| 2007/0250734 A1 | 10/2007 | Thibadeau | |
| 2007/0250915 A1 | 10/2007 | Thibadeau | |
| 2008/0215306 A1 | 9/2008 | Lidji et al. | |
| 2009/0235109 A1 | 9/2009 | Thibadeau | |

FOREIGN PATENT DOCUMENTS

| | | |
|---|---|---|
| CN | 1716221 A | 1/2006 |
| EP | 0 965 903 A1 | 12/1999 |
| JP | 2041550 A * | 2/1990 |
| JP | 5134863 A2 | 6/1993 |
| JP | 5134895 A * | 6/1993 |
| JP | 8115266 A2 | 5/1996 |
| JP | 10097446 A * | 4/1998 |
| JP | 2001-175354 | 6/2001 |
| JP | 2002-100118 | 4/2002 |
| JP | 2003091704 A | 3/2003 |
| JP | 2004-199410 | 7/2004 |
| JP | 2004-303095 | 10/2004 |
| JP | 2008-287020 | 11/2008 |
| JP | 2010-097445 | 4/2010 |
| WO | WO 99/59049 | 11/1999 |
| WO | WO 00/13073 A1 | 3/2000 |
| WO | 0180190 | 10/2001 |
| WO | WO 01/95273 A1 | 12/2001 |

OTHER PUBLICATIONS

"TCPA Security and Internet Business : Vital Issues for IT," Aug. 2000, pp. 1-70.

"TCPA PC Specific Implementation Specification", Ver. 1.1, Aug. 2003, pp. 1-70.

Gobioff, H. et al. "Security for Network Attached Storage Devices," School of Computer Science, Carnegie Mellon Univ. Oct. 1997.

Saltzer, Jerome H. "Protection and the Control of Information Sharing in Multics," *Communications of the ACM*, vol. 17, No. 7, Jul. 1974.

"Intel® Protected Access Architecture," Application Interface Specification, Revision 1.0, Mar. 2001.

"Public Protection of Software," *ACM Transactions on Computer Systems*, vol. 5, No. 4, Nov. 1987, pp. 371-393.

Wilkes, M.V. "Hardware Support for Memory Protection Capability Implementations," Digital Equipment Corporation, ACM 1982, pp. 108-116.

TC Specification Architecture Overview, Specification Revision 1.2 Apr. 2004.

Initializing the CryptoMemory® Device for Smart Card Applications, Amtel CryptoMemory® Application Note, Amtel Corporation, 2003. pp. 1-12.

Office Action for related U.S. Appl. No. 10/963,373, filed May 15, 2007, 6 pages.

"Memory Protection Software Facility for OS/2 Shared Data Applications", IBM Technical Disclosure Bulletin, pp. 81-89, Sep. 1991.

"Modular System Partition", IBM Technical Disclosure Bulletin, pp. 341-342, Dec. 1992.

"Password Protection of Separate Hard Disk Partitions", IBM Technical Disclosure Bulletin, pp. 103-104, Nov. 1996.

"Preventing Access to a Personal Computer", IBM Technical Disclosure Bulletin, pp. 98-100, Sep. 1992.

"Protection and Control of Information Sharing in Multics", Communications of the ACM, vol. 17, No. 7,Jul. 1974.

Strunk, J.D. et al., "Self Security Storage: Protecting Data in Compromised Systems", 4th Symposium on Operating Systems Design and Implementation, Oct. 2000, pp. 1-15.

Tao et al., "Research on a Dedicated CPU Architecture for Java IC Card", ACTA Electronical Sinica, vol. 28, No. 11, Nov. 2000, pp. 77-80, 76. Chinese Inst. Electron, China.

"Trusted Computing Platform Alliance (TCPA)", Main Specification Version 1.1b, Booklet, Feb. 2002, pp. 1-332, Previously published under the title: "Trusted Computing Platform Alliance (TCPA)" Main Specification Version 1.1a.

English Translation of an ISR of the EPO for OCT/US2002/23907, filed Jul. 25, 2002.

Official Search Report of the Australian Patent Office in counterpart application No. SG 200703024-1, filed Apr. 24, 2007.

Office Action dated Dec. 30, 2009 of U.S. Appl. No. 11/410,453, filed Apr. 25, 2006.

Office Action dated Sep. 15, 2009, from corresponding Japanese application No. 2007-112174.

Korean Intellectual Property Tribunal Trial Decision dated Sep. 3, 2010 for corresponding Korean application No. 10-2007-0040214.

Prosecution documents associated with U.S. Appl. No. 11/410,702 including: Office Acton mailed Feb. 2, 2010.

Prosecution documents associated with U.S. Appl. No. 11/410,453 including: Office Action mailed Dec. 3, 2010.

Prosecution Documents Associated with U.S. Appl. No. 09/912,931 including: Preliminary Amendment filed Jul. 18, 2003 Office Action mailed Aug. 5, 2004 Amendment filed Nov. 8, 2004 Office Action mailed Feb. 17, 2005.

Prosecution Documents Associated with U.S. Appl. No. 10/963,373 including: Office Action mailed May 15, 2007 Notice of Abandonment mailed Nov. 28, 2007.

Prosecution Documents Associated with U.S. Appl. No. 11/178,908 including: Preliminary Amendment filed Nov. 14, 2005 Office Action mailed Jun. 19, 2007 Amendment filed Sep. 19, 2007 Terminal Disclaimer filed Oct. 16, 2007.

Prosecution Documents Associated with U.S. Appl. No. 11/346,118 including: Preliminary Amendment filed Feb. 2, 2006 Preliminary Amendment filed Oct. 31, 2007 Office Action mailed Jan. 29, 2008 Amendment filed Apr. 29, 2008.

Prosecution Documents Associated with U.S. Appl. No. 11/343,338 including: Office Action mailed May 7, 2009 Amendment filed May 29, 2009 Office Action mailed Aug. 13, 2009 Amendment filed Dec. 9, 2009.

Brenner, R., "Smart Cards with Built-In Microprocessors: Partition into Virtual Cards", Elektronik, vol. 43, No. 9, May 3, 1994, pp. 38-44, Germany.

"SECUR'ACCess: Access control with the CP8 smart card", Securicom 87, 5th Worldwide Congress on Computer and Communications Security and Protection, DEDEP, 1987, pp. 187-196, Paris, France.

* cited by examiner

SYSTEM AND METHOD FOR DELIVERING VERSATILE SECURITY, DIGITAL RIGHTS MANAGEMENT, AND PRIVACY SERVICES

CROSS REFERENCE TO RELATED APPLICATION(S)

This application is a continuation in part of pending application Ser. No. 10/963,373, filed Oct. 12, 2004, entitled "SYSTEM AND METHOD FOR DELIVERING VERSATILE SECURITY, DIGITAL RIGHTS MANAGEMENT, AND PRIVACY SERVICES FROM STORAGE CONTROLLERS," which is a continuation in part of pending application Ser. No. 09/912,931, filed on Jul. 25, 2001, entitled "METHODS AND SYSTEMS FOR PROMOTING SECURITY IN A COMPUTER SYSTEM EMPLOYING ATTACHED STORAGE DEVICES," both of which are incorporated herein by reference in their entireties.

BACKGROUND OF THE INVENTION

The present invention generally relates to methods and systems for securing computer systems. More particularly, the present invention relates to methods and devices containing a security partition and a disc drive architecture for securing information in a system, which may be connected to a networked environment.

Computer operating systems or platforms play a central role in electronic commerce, as well as in day-to-day business operations for large and small companies alike. As more computer systems become connected to networks (private and public), the need to secure information has become critical. Unfortunately, traditional operating systems provide limited security.

To protect information, most business have taken steps to protect individual server platforms. However, no overall corresponding improvement in client platforms has been implemented, in part, because of the variety of client platforms and because of the cost. While the PC platform provides the benefits of flexibility and openness, fueling exceptional economic growth, the same benefits also expose users to security breaches, such as hackers, viruses, and the like.

It is sometimes possible to detect whether software has been modified, provided that it is known what element of the OS might have been modified. However, current computing platform technologies do not allow a local or remote user to test whether a platform can be trusted with sensitive information. For example, a host system can verify that a particular user is accessing the system, but it is difficult (if not impossible) to establish with certainty whether the particular user's computing platform is a corporate machine and whether it runs the required software and configurations.

With the advent and widespread deployment of the Internet, the deficiencies of conventional computer security systems have been exposed and sometimes exploited. A disadvantage of the Internet is that it permits many ways to infiltrate the perimeter defenses of conventional computer systems. Damaging virus programs, for example, can be injected through firewalls and into a computer system. Generally, infiltration of these perimeter defenses can compromise data and computer programs, which can impact derivative capabilities, such as digital rights management.

While software has been developed to provide some protection on a platform by platform basis, software-only security implementations are dependent on proper installation and execution. A conventional example of such localized computer system security is virus detection software. Virus detection software, however, can be susceptible to exploitation by, for example "spoofing" or "wrappering" strategies. In a compromised system, virus detection software may be made to appear operational, even when it is not operating properly. This highlights a fundamental problem with conventional computer security systems, namely that the security system operates within the same environment as the operating system. Software security implementations (such as virus detection software) may be impacted by software that has already been executed on the software platform. The phrase "software platform" as used herein generally refers to the operating environment or operating system (OS). Even tightly controlled software cannot vouch for its own integrity. For example, if malicious software, such as a virus, has bypassed the perimeter defenses or security features of the OS and has managed to corrupt its operation, the OS cannot be expected to recognize the security breach, reliably.

Furthermore, the operating system environment for many computer systems is also common, for example, to the Internet environment or to another network communications medium. Because of the commonality between the client operating system and the operating environment, many means of attack on a computer system are available merely by moving computer code, for example, from the Internet to the computer operating system.

Some conventional methods of computer protection may involve special purpose security hardware or firmware installed in the BIOS of a computer system. These methods can establish secondary lines of defense internal to operation of a computer system but external to the complicated and error-prone operating system environment.

Other conventional computer security systems may include a security device connected to a SCSI bus that protects storage devices on the bus. This type of security system recognizes that the storage device is more secure while not operating in an environment common to the operating system. However, the SCSI bus of this system exposes all devices on the bus, including the storage devices. Specifically, the SCSI bus exposes all devices on the bus by allowing access to the attached devices. Therefore, effective utilization of a security device attached to a SCSI bus requires intimate operating systems involvement.

Still other computer security systems recognize the benefit of guarding the storage device at the controller level but are based on shared private keys. Shared private keys are well-known to provide less security than securing and concealing elements of public-private key encryption, because authentication keys are shared and are not private to a single device. This type of system suffers the same problem of operating system dependence illustrated above, because it is also directed to modification of the file management system of the computer operating system.

In another type of computer security system, the security perimeter consists of self-contained software that exports only a simple storage interface for external access and that verifies the integrity of each command before processing the command. By contrast, most file servers and client machines execute a multitude of services that are susceptible to attack. Typically, such a system provides for automated recovery to a known good state, relying on secure storage mechanisms. Unfortunately, this type of system also requires operating systems modification. The automated recovery system incorporates complexity and, therefore, vulnerability, approaching that of an OS. Moreover, the automated recovery system permits opportunities for the introduction of Trojan horses, and the like. "Trojan Horse" is a generic term for a irus or a security-violating program or script that is disguised as something else. Typically, a Trojan Horse masquerades as a benign program, like a directory Lister for example, but which contains a trap door or attack program that can be used to break into a network.

The ATA Host Protected Area security protocol provides security to a computer system by hiding a portion of a storage media of a storage device during the boot phase of a computer system. In this method, the storage device hides a portion of the storage media by telling the operating system that the storage device has less storage space than the storage device actually has. The undeclared storage space represents an area of the storage media that is essentially inaccessible to the BIOS. Special BIOS firmware or other special code can have exclusive access to the hidden or undeclared portion of storage device. As an additional security measure, the ATA Host Protected Area can require passcode access to this additional amount of storage space. The ATA Host Protected Area was originally designed to provide security assurance in the form of an enhanced operating system and application crash recovery system. For example, the hidden or undeclared portion of the storage device can be used to cache a known good version of the system or application software, outside the capability of the operating system to address. In practice, this restricts access to a portion of the storage device to a computer program running either in the main device firmware or in the operating system environment.

However, the ATA Host Protected Area protocol has a security hole in that it is still possible to intercept communications with the storage device. The hidden ATA Host Protected Area partition of the storage device can be revealed, for example, by putting that same disc drive into another computer that does not reserve the Host Protected space. The passcode, if used, is not retained across power cycles. While the ATA Host Protected Area is an acceptable place to protect local backup code and data from virus-like infections, the ATA Host Protected Area is typically not the best place to conceal data. Furthermore, the only authentication required by ATA Host Protected Area is a "first come, first served, winner take all" type of device authentication.

Still another type of computer security system involves a Trusted Computing Platform (TCP). In general, a trusted platform (TP) is a computing platform that is trusted by local users and remote entities, including users, software, web sites and all third parties. To enable a user to trust a computing platform, a trusted relationship must be built between the user and the computing platform, which can verify to the user that an expected boot process, a selected operating system, and a set of selected security features in the computing platform have been properly installed and are functioning correctly. An organization called the "Trusted Computing Platform Alliance" (TCPA, and later reconstituted as the Trusted Computing Group, TCG) has defined a specification for the TCP. The TCPA/TCG via the specification advocates that a separate mechanism, called the Subsystem, be used to establish trust relationships between various modules and components within the system and with other entities. Generally, the subsystem includes a Trusted Platform Module (TPM) and software for performing integrity metrics in conjunction with the TPM.

The Subsystem is designed to prevent logical, or software-based attacks. Generally, the Subsystem establishes a hardware-based foundation for trust, based on a set of integrity metrics, which are defined as measurements of key platform characteristics. Specifically, the integrity metrics are measurements that can be used to establish platform identity, such as BIOS, boot-loader, OS loader, and OS security policies. Cryptographic hashing techniques are used to extend trust from the BIOS to other areas of the platform.

Any type of computing platform (for example, a PC, server, personal digital assistant (PDA), printer, mobile phone, or any other networkable device) may be a trusted platform. A trusted platform is particularly useful for mobile platforms that are connected to a network, in part, because physical mobility coupled with connectivity increases the need for stronger trust and confidence in the computer platform. In particular, such connectivity and mobility increases the likelihood of viruses and of unauthorized access to critical systems. Unfortunately, though the present trusted drive architecture prevents the drive from being compromised by logical or software based attacks, the Subsystem may, optionally, still be compromised by physical means, which can expose the secrets of the Subsystem.

SUMMARY OF THE INVENTION

In one embodiment, a storage media of a storage device is partitioned into a hidden partition and a storage partition. A base class is written to the hidden partition. A security provider base is instantiated from the base class. The security provider base class is adapted to control access to the storage media.

In another embodiment, the storage device has a processor and firmware adapted to access data stored on a storage media. Disc drive firmware is written to a controller of the storage device. The storage media of the storage device is partitioned into a hidden portion and a data portion. A security provider object template is written to the hidden partition. Security providers are instantiated using the security provider object template. Each security provider is adapted to control access to the storage device.

A storage device for providing hardened security features has a storage media partitioned into a hidden portion and a data portion and has a storage controller adapted to control access to the storage media. A trusted drive feature is stored in a firmware of the storage controller, and is adapted to authenticate access requests to determine whether each access request can be trusted. A SP base object is stored in the hidden portion, and is adapted to cooperate with the trusted drive feature to control access rights to data on the storage media.

DETAILED DESCRIPTION

Figure 1:
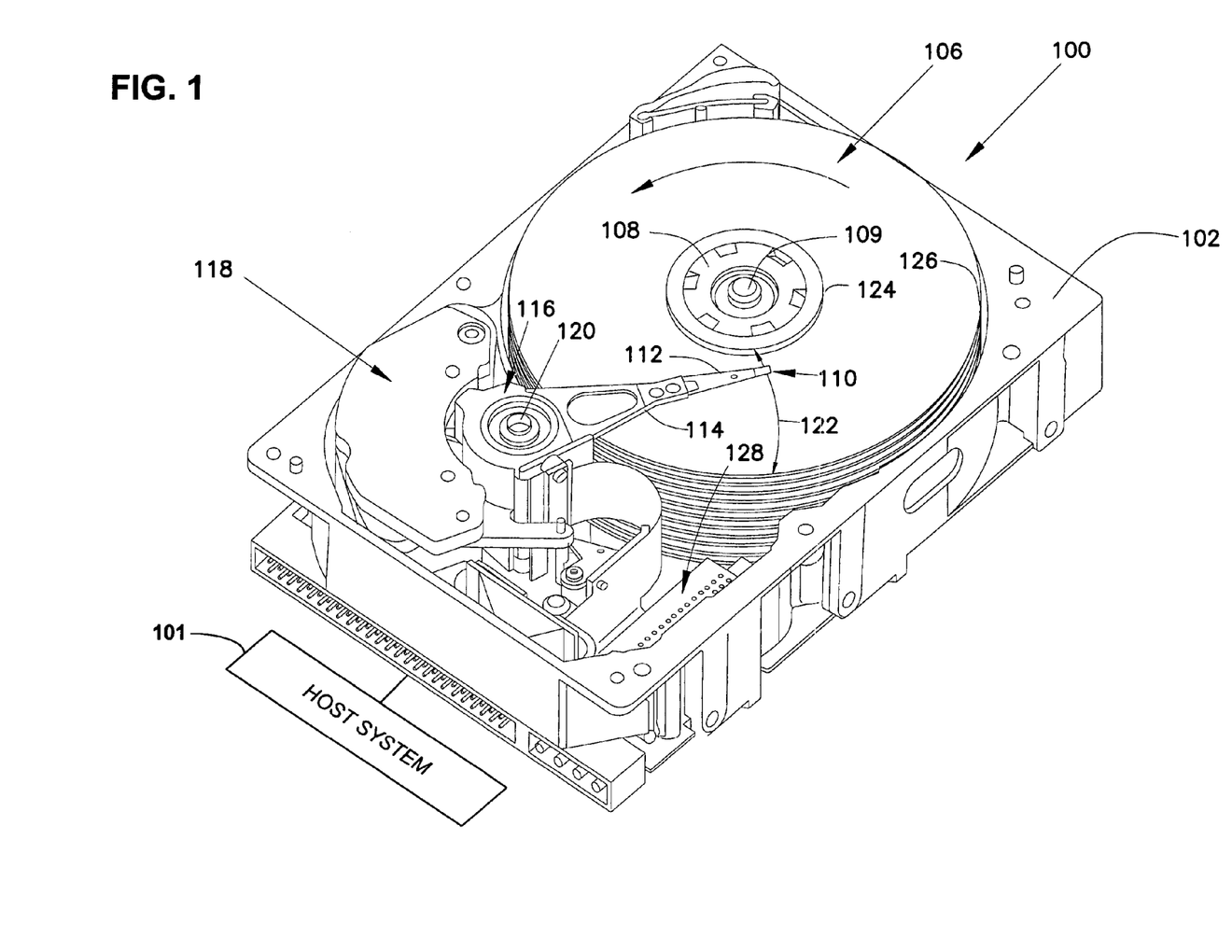
FIG. 1 is a perspective view of a disc drive in which the present invention is useful.

FIG. 1 is a perspective view of a disc drive 100 in which the present invention may be used. Disc drive 100 can be configured as a traditional magnetic disc drive, a magneto-optical disc drive or an optical disc drive, for example. Disc drive 100 includes a housing with a base 102 and a top cover (not shown). Disc drive 100 further includes a disc pack 106, which is mounted on a spindle motor (not shown) by a disc clamp 108. Disc pack 106 includes a plurality of individual discs 107, which are mounted for co-rotation about central axis 109. Each disc surface has an associated slider 110, which is mounted to disc drive 100 and carries a read/write head for communication with the disc surface.

In the example shown in FIG. 1, sliders 110 are supported by suspensions 112 which are in turn attached to track accessing arms 114 of an actuator 116. The actuator shown in FIG. 1 is of the type known as a rotary moving coil actuator and includes a voice coil motor (VCM), shown generally at 118. Voice coil motor 118 rotates actuator 116 with its attached sliders 110 about a pivot shaft 120 to position sliders 110 over a desired data track along a path 122 between a disc inner diameter 124 and a disc outer diameter 126. Voice coil motor 118 operates under control of internal circuitry 128. Other types of actuators can also be used, such as linear actuators.

During operation, as discs 107 rotate, the discs drag air under the respective sliders 110 and along their bearing surfaces in a direction approximately parallel to the tangential velocity of the discs. As the air passes beneath the bearing surfaces, air compression along the air flow path causes the air pressure between the discs and the bearing surfaces to increase, creating a hydrodynamic lifting force that counteracts the load force provided by suspensions 112. The hydrodynamic lift force causes the sliders 110 to lift and fly above or in close proximity to the disc surfaces.

In general, disc drive controllers and storage subsystem controllers currently trust their hosts. Various threats, as outlined above, can compromise host security and allow unauthorized access to confidential information that is stored on disc drives and on storage subsystems. Therefore, there is a need for improved security of storage devices and storage subsystems.

Hereinafter, the terms "storage device", "storage subsystem" and "disc drive" or "disc" are used interchangeably, except where otherwise noted, and include any data storage device that is accessible directly via a network or that is installed within a computer system. The storage device need not necessarily incorporate a physical "disc", but preferably incorporates a place for storage managed by a controller with firmware.

As used herein, the phrase "computer system" is used to refer to any device having a memory storage that can be connected to a private or public network, whether directly or indirectly. For example, computer systems include, but are not limited to, desktop computer systems, laptop computer systems, networked computer systems, wireless systems such as cellular phones and PDA's, digital cameras including self-contained web-cams, and/or any reasonable combination of these systems and de-vices.

One solution for improving storage device security involves introducing a sophisticated operating system architecture, such as Unix, Linux, Windows, and the like, into the controller for the storage device. High-end systems, such as Storage Area Network (SAN) systems, have adopted this approach.

An alternative solution involves building access controls into the resource-limited environments of disc drives and storage subsystem controllers. Unfortunately, this technique costs precious additional physical controller resources and risks inconvenience to the customer when access is denied.

The present invention relates to a system and method for promoting storage device security using a trusted drive architecture. The "Trusted Drive" design (meaning a drive or storage subsystem controller design) for providing versatile security and digital rights management according to the present invention pertains to specific types of hidden data and hidden operations.

Figure 2A:
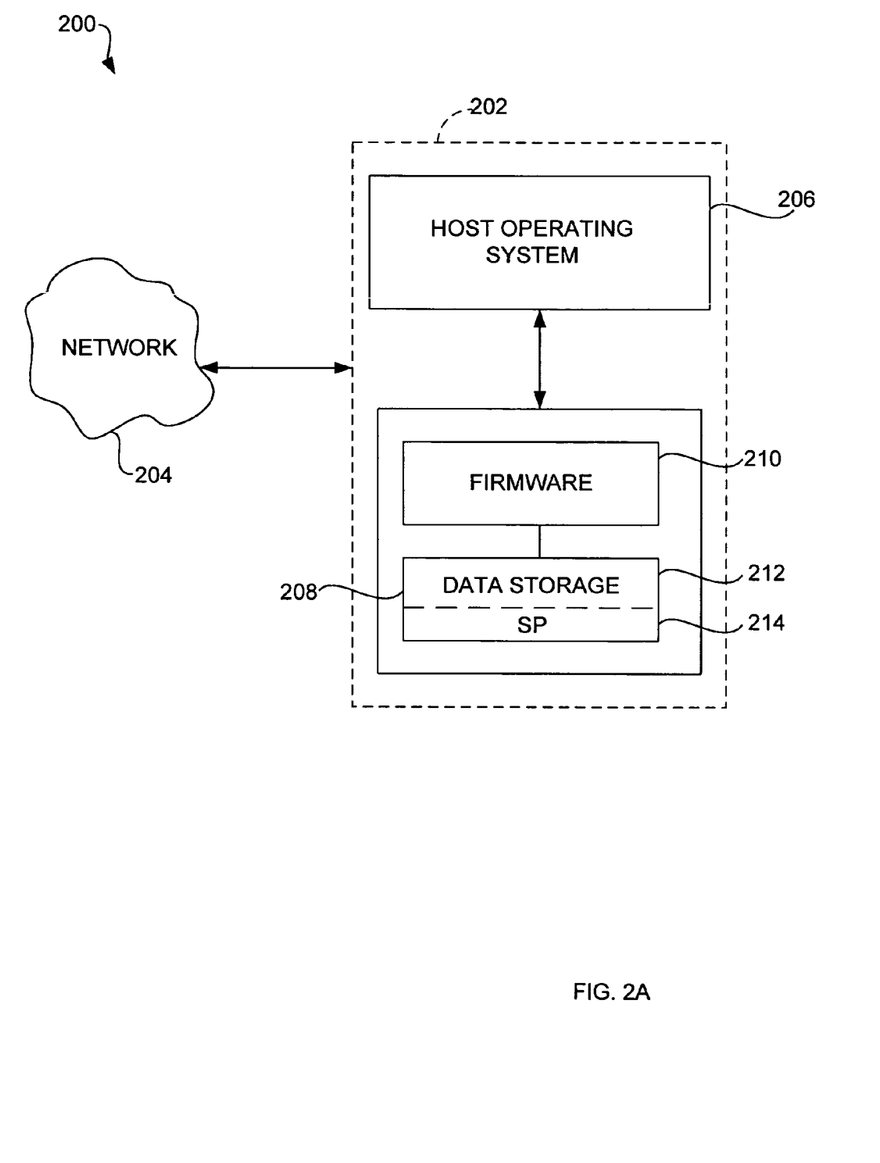
FIG. 2A is a simplified block diagram of a system according to one embodiment of the present invention.

FIG. 2A illustrates a simplified block diagram of a system 200 including a security provider (SP) according to an embodiment of the present invention. As shown, the system 200 has a storage subsystem 202 in communication with a network 204. The network 204 can be of any type, including local area network (LAN), wide area network (WAN), the Internet, ad hoc wireless network, public switched network, and so on. Additionally, the term storage subsystem 202 refers to any device capable of connecting (directly or indirectly) to a network 204. For example, the storage subsystem 202 may be a storage media internal to computer system. Alternatively, the storage subsystem 202 may be a stand-alone device capable of connecting directly to a network or attaching as a peripheral device to a personal computer or workstation.

The storage subsystem 202 includes a host operating system 206, which relies at least in part on software and data obtained from a storage media 208. Typically, the storage media 208 includes firmware 210 that reads and writes data to and from a data storage portion 212 of the storage media 208. Additionally, at least a portion of the storage device firmware 210 can be rewritten by the operation system, and at least another portion of the device firmware 210 resists being written by the operating system and may be written only using one or more of the conventional hardware methods.

Finally, the storage subsystem 202 may include a hidden partition 214, which can be used to store the SP or elements of the SP required for access to data stored in the hidden partition and/or on the data storage portion 212 of the storage device 208. Specifically, the SP may be used by the storage subsystem 202 to control access to the storage device 208 as a whole, and to the data storage portion 212 and the hidden partition 214 in particular.

In general, the hidden partition 214 is a contiguous logical set of blocks in the storage subsystem 202, which are not acknowledged to the operating system 206 of the host because these logical blocks are not addressed by the read/write commands. In other words, the hidden partition 214 is hidden precisely because the host operating system 206 is not aware that it exists except through commands specialized to the security features. If, for example, the storage subsystem 202 has a total storage space of four hundred Gigabytes, and two hundred Megabytes are reserved for the hidden partition 214, then the host operating system 206 is informed that the total disk space of the storage subsystem 202 equals 399.8 Gigabytes. The two hundred Megabyte hidden partition 214 is simply not available to the operating system 206 for read/write operations.

The term "partition" is used herein to mean a contiguous grouping of bytes allocated during low-level formatting of the storage device. In certain embodiments, "partition" may refer to a contiguous grouping of memory blocks of approximately 512 bytes each. Special security partitions and the structures and processes that support these security partitions are included in the present computer security system. Moreover, the system of the present invention is substantially not dependent on an operating system.

Generally, the persistent data for a Security Provider (SP) is stored in a contiguous, logical set of blocks in the storage subsystem 202. In a preferred embodiment, the contiguous, logical set of blocks in the storage subsystem 202 constitutes a hidden partition 214. The persistent data typically includes the name, passcode, and public-private keys for the SP and for the authorized users of the SP. In otherwords, the SP stores its name and its passcode (the passcode the SP uses to authorize itself), and its public-private keys, as well as the names, passcodes and public keys of its permitted users. The persistent data is stored in an authority table. An authority record is an entry in the authority table for a single user agent. This user agent may represent a real person, or may represent another SP, a device, or any other entity capability of providing the proper credentials.

It will be understood that an SP is (for the most part) a completely self-contained unit that manages its own access control. The SP also controls access to elements within the SP or accessible via firmware to the SP. The credentials needed for access include the name, the passcode, and the capability of proving identity by digitally signing and directing information by exchange only to the recipient. In establishing the access controls for a SP, the creator can choose to allow access based on knowledge of the SP's name, of a passcode, and/or of private and public keys.

By building the access control to controller resources into the storage subsystems 202, the cost to the use of physical storage resources can be balanced against the improved security features. Specifically, the access control architecture of the drive can be manipulated externally, scaled as needed from low-end to high-end controller systems, and enhanced dramatically to provide hardened security services.

The phrase "manipulated externally" refers to the fact that access control parameters can be variously set by the factory, the OEM, the VAR, the Company, and the end user. Access controls can be strong or weak depending on the capabilities desired and on the user's tolerance for inconveniences associated with access control procedures.

The access control architecture is scalable, meaning that a single model of access control can be fabricated at low costs. As capabilities are added to the access control architecture, the costs may increase. Such increased capabilities include support for physical access tokens (such as Smart Card access, digital fingerprinting and the like) and speed (such as encryption hardware and the like).

The development of such security tokens, smart cards, and other similar security features has resulted in standards that can be applied to offer well-understood, hardened security services to the customer.

Generally, there are three relatively well-known and publicly accessible standards for providing such security features. One is the Microsoft Cryptographic Service Provider standard. Another is the RSA Security Public Key Cryptography Standard Number 11 or "Cryptoki". A third is the class of ISO 7816 ICC Smartcard standards and their derivatives.

The Microsoft Cryptographic Service Provider standard (MS CSP), produced by Microsoft Corporation of Redmond, Wash., is an example of such hardened security. The MS CSP carefully defines the special controller (e.g., smart card or special chip) functionality need by the operating system (in this case the Microsoft Windows operating system) for hardened login, named resource access, cross-domain authorization, file encryption, network encryption, and secure network access for email and Internet services. The MS CSP is designed for environments using tokens and cryptographic chips.

Similarly, for Unix, Linux, and Java operating systems, there is another standard corresponding to the MS CSP standard. For these operating systems, the standard is called the RSA PKCS#11 standard, which is a standard developed by RSA Laboratories, a research arm of RSA Security of Bedford, Mass. "PKCS" is an acronym for Public Key Cryptography Standard.

The class of 7816 ICC Smart Card standards provides more capability and versatility than the CSP or PKCS#11. Where the CSP provides cryptographic operations, and PKCS#11 additionally provides storage for certifications, the 7816 standards and their derivatives additionally provide full file system storage with access control that is different for different files.

A disc drive or storage subsystem that simply offers MS CSP, RSA PKCS#11, and ISO 7816 services represents a cost effective, well-accepted way to harden the associated operating system against threats. Firmware packages that implement the external controller-side of CSP, PKCS#11, and ISO 7816 are typically in the thirty to sixty Kilobyte range in size.

Distinct collections of security services that share underlying hardware already exist and can be referred to as Security Provider Objects or SP Objects. Fundamentally, SP Objects provide access control to controller resources and storage data. For example, a Controller SP Object provides access control to test diagnostics and maintenance programs that run in the controller. Because there are literally thousands of companies that provide host and network security products that can be used to harden security via the MS CSP, RSA PKCS#11, or ISO 7816 standards, the SP Objects are designed to be independent of one another. The SP Objects are generally self-contained, but they tend to utilize a common toolset. Generally, the SP Object can be considered a self-contained environment with its own access controls to its own security resources. This allows disc controller resources to be minimized. Specifically, while a disc drive or storage subsystem might be required to support many different security products, only a small subset of such security products would typically be enabled at any given time. Moreover, no particular SP Object would be enabled "all the time". A characteristic of the RSA PKCS#11, MS CSP, and ISO 7816 standards are that the operating systems tend to use them in small bursts. For example, when browsing the Internet, the CSP is used only when the user accesses secure web pages (pages utilizing secure socket layer security, for example). While accessing such pages, the CSP is used intensively (with many "calls" per second), but when not access as secure page, the CSP is not used. This security access tendency is true for most security applications.

With respect to Trusted Drive implementations, the trusted drive feature can be referred to as a SP as well. In general, the storage subsystem or disc drive according to a embodiment of the present invention is adapted to provide hardened security features, including trusted drive features.

Figure 2B:
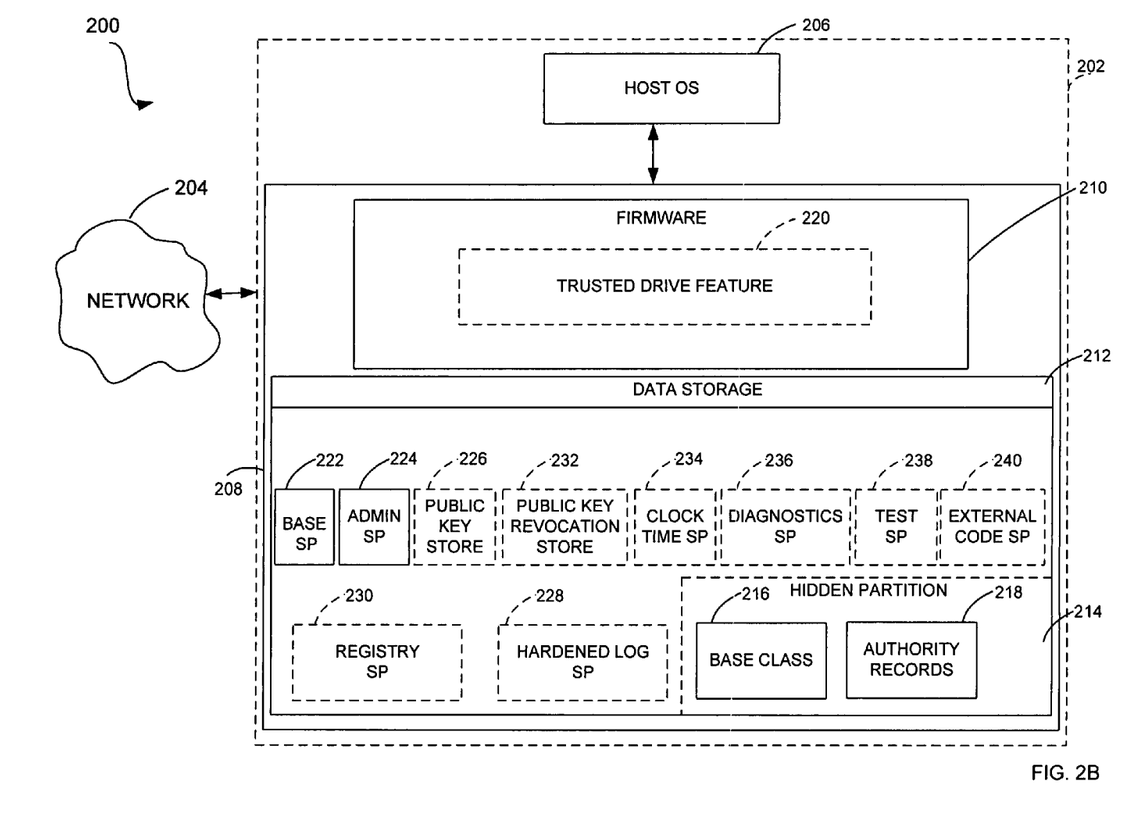
FIG. 2B is a simplified block diagram of a system according to another embodiment of the present invention.

Referring to FIG. 2B, the system 200 is shown as a simplified block diagram including a trusted drive feature according to an embodiment of the present invention. As shown, the system 200 has a storage subsystem 202 in communication with a network 204. The network 204 can be of any type, including local area network (LAN), wide area network (WAN), the Internet, ad hoc wireless network, public switched network, and so on. Additionally, the term storage subsystem 202 refers to any device capable of connecting (directly or indirectly) to a network 204. For example, the storage subsystem 202 may be a storage media internal to a personal computer or a server. Alternatively, the storage subsystem 202 may be a stand-alone device capable of connecting directly to a network or attaching as a peripheral device to a personal computer or workstation.

The storage subsystem 202 includes a host operating system 206, which relies at least in part on software and data obtained from a storage media 208. Typically, the storage media 208 includes firmware 210 that reads and writes data to and from the storage media 208. The storage media 208 is divided into a data portion 212 and a hidden portion (hidden partition) 214. In this embodiment, a trusted drive feature 220 is embedded in the controller within the firmware 210.

Additionally, at least a portion of the storage device firmware 210 can be rewritten by the operation system, and at least another portion of the device firmware 210 resists being written by the operating system and may be written only using one or more of the conventional hardware methods. In a preferred embodiment, the trusted drive feature 220 is stored in the portion of the firmware 210 that resists being written by the operating system (non-writeable firmware).

In general, the hidden partition 214 is a contiguous logical set of blocks in the storage subsystem 202, which are not acknowledged to the operating system 206 of the host during the boot process. In other words, the host operating system 206 is not aware that the hidden partition 214 exists. If, for example, the storage subsystem 202 has a total storage space of four hundred Gigabytes, and two hundred Megabytes are reserved for the hidden partition 214, then the host operating system 206 is informed that the total disk space of the storage subsystem 202 equals 399.8 Gigabytes. The two hundred Megabyte hidden partition 214 is simply not available to the operating system 206 for read/write operations.

Within the hidden partition 214, one or more authority records 216 and a base class 218 are stored. The authority records 216 can be used to store the SP or elements of the SP required for access to data stored in the hidden partition and/or on the data storage portion 212 of the storage device 208. In one embodiment, all authority records 216 can be governed by a single master authority record. The host OS 206 is not permitted to access the SP data stored within the hidden partition 214, except through the trusted drive feature 220. This independence of the SP data from the Host OS 206 provides an important benefit over conventional security methods and systems, namely that the hidden partition represents a location on a computer system where information such as a secret can be effectively concealed.

Finally, the hidden portion 214 of the storage device 208 has a base class 218, which can be used to specify a SP Base class 222, from which all of the security provider classes ultimately derive. The base class 218 is sometimes referred to as a "root class", and the SP base class is a "subclass" within a hierarchy of classes of the security provider. Generally, the base class 218 allows the OEM or the manufacturer to specify a SP base class 222 from which each SP Object can be instantiated and from which all other SP classes derive. The SP Base class 222 provides default methods for an instantiated SP. For example, the SP Base class 222 provides default record data management methods and a default administration key, which can be used to log into the administration SP 228 and to configure access controls, which can override the default configuration. In other words, the administration SP 228 can be used to configure the access controls to disallow access using the default key and even to change access permissions for the administration SP 228.

The base class 218 also provides default methods for the secure import and export of entire SPs and parts of SPs and for local replication of entire SPs within the storage controller based on, triggers internal to the storage controller.

During manufacturing, all trusted drives are initialized with an administration SP 228 and a "Controller SP Object" (which in this embodiment is the trusted drive feature 220). The administration SP 224 provides access control to the creation, modification, and deletion of other SP Objects.

Once the administration SP 224 is initialized, it is logged into, and the controller SP object is initialized with its own access controls. Significantly, it is then possible to deny the administration SP 224 a right to further modify or destroy the controller SP.

As shown in FIG. 2B, in addition to the base SP 222 and the administration SP 224, other SP objects (elements 226-232) may be instantiated using the base SP 226, including a public key store 226, a log SP 228, a registry SP 230, public key revocation store 232, a clock time SP 234, a diagnostics SP 236, a test SP 238, and an external code SP 240. Access to the administration SP 224 is required for the creation of other SPs on a storage controller.

A public key store 226 is used to cryptographically verify a request for a new SP instantiation. For example, in one embodiment, a SP Object from the storage device manufacturer may require a digital signature associated with the storage device manufacturer in order to validate a request for a new SP instantiation. A Computer Associates eTrust SP may require a Computer Associates signature or certificate to validate a request for a new eTrust SP instantiation. If the storage device does not support public key access in the general access controls defined by the controller SP, no resident authorizing key is required.

In another embodiment, the trusted drive system 200 has a log SP 228 type that can track and log the activity of other SPs based on the success or failure of the other SP to gain access to data or to manipulate data or methods associated with the other SP. The log SP 228 incorporates provisions for cyclic logs and all other capabilities possible through the general access controls.

In yet another embodiment, the trusted drive system 200 has a registry SP 230 type that provides a standard SP handle (virtual distinguished name) through which any number of physical copies of a SP Object can be located and managed. The Registry SP 230 can distinguish and manage Master SPs from copies of the Master (both local and non-local), and can distinguish and manage specific Master data within an SP so that there can be a "Master Record" or "Master Value."

In another embodiment, the trusted drive system 200 is provided with a key and passcode revocation store 232, which checks authorizing public keys, passcodes and other authentication elements for revocation. In still another embodiment, the system 200 includes a clock-time SP type 234 that can provide a hardened source of clock or elapsed time both to other SPs and to the Host.

In yet another embodiment, the system 200 provides a diagnostics SP 236 adapted to provide hardened access control to storage controller diagnostics. A test SP 238 may be provided to harden control to storage controller testing as appropriate. Additionally, an external code SP 240 may be provided to harden access controls to customer provided software running on the storage controller.

Each of the above-described embodiments may be implemented in a single trusted drive system 200 (as shown in FIG. 2B). Alternatively, various SP elements 226-240 may be selected to be included as needed. The base class 224 provided in the hidden partition 214 is used to create each base SP 222, and the base SP 222 is used to create the SP objects for hardened security. In general, the storage location of the base SP 222 and the various SP objects 224-240 may vary. Specifically, the SP objects 222-240 may all be stored outside of the hidden partition (as shown) or may be stored within the hidden partition. Alternatively, the public key store 226 may be stored within the hidden partition 214, while other elements are stored outside of the hidden partition 214 in the data store 212.

In one embodiment, all of the SP objects 222-240 are provided within the hidden partition 214. In a second embodiment, all of the SP objects 222-240 are provided outside of the hidden partition. In a third embodiment, the base SP 222, the administration SP 224 and the public key store 226 are provided within the hidden partition 214, while the other sp objects 228-240 are stored in the data store 212. The specific arrangement of the SP Objects 222-240 depends on the security implementation, on the memory allocation for the hidden partition 214, and on various design and implementation issues, such as (for example) whether the OEM will be permitted to instantiate and configure additional SP objects.

Figure 3:
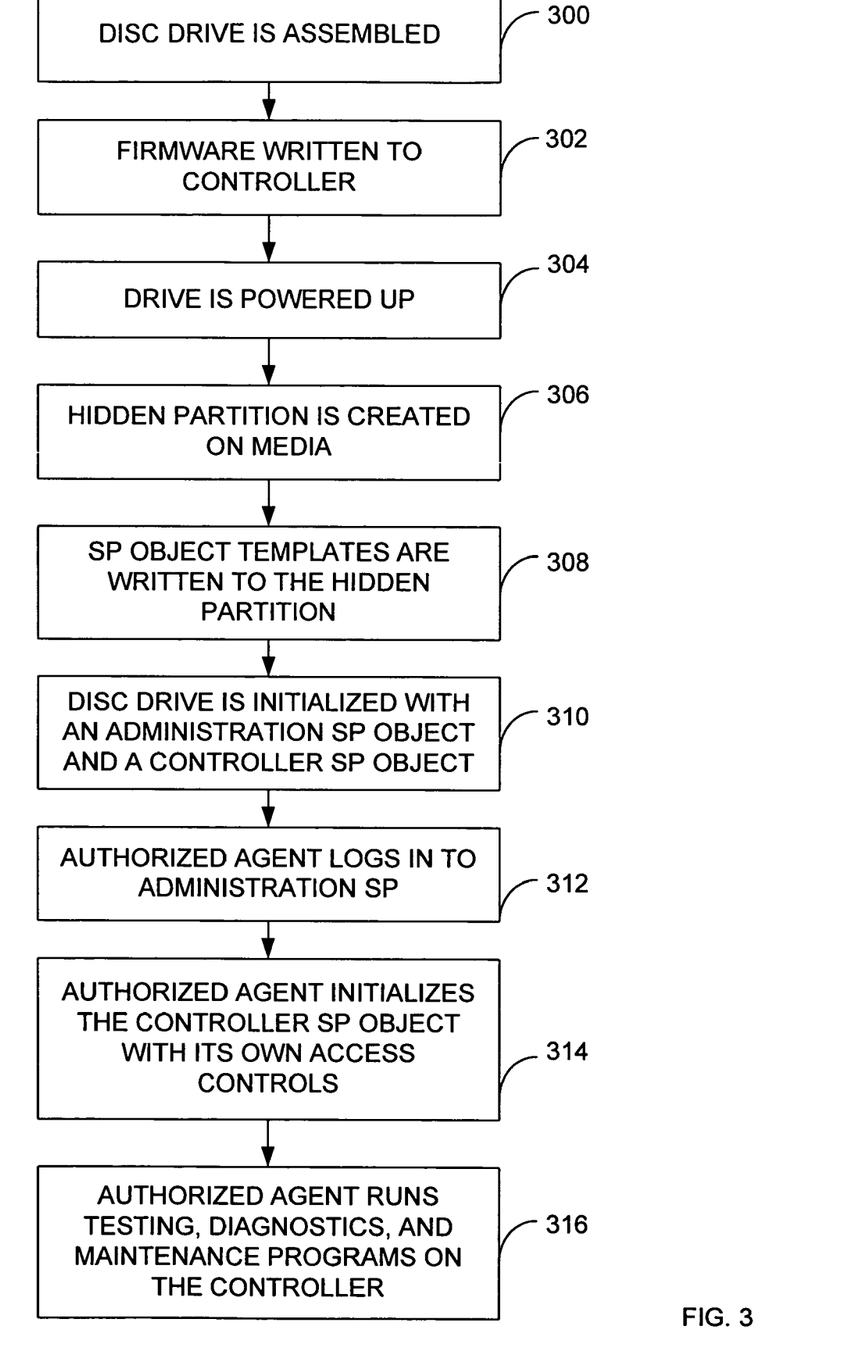
FIG. 3 is a simplified flow diagram of the creation of a Trusted drive according to an embodiment of the present invention.

FIG. 3 is a simplified flow diagram illustrating an installation of a trusted drive architecture at the factory. Once the disc drive hardware is assembled (step 300), firmware is written to the drive controllers or the storage subsystem controllers (step 302). Generally, the firmware includes trusted drive controls and optionally encryption functions. Additionally, in cases where hardware acceleration of cryptographic operations is desirable, special hardware may be added.

The disc drive or storage subsystem is then powered up (step 304). A hidden partition is created on the storage media (step 306), and SP Object templates are created and written to the hidden partition (step 308). Various versions of trusted drives that offer many instances of SP Objects to many different companies may allocate a large hidden partition (as much as a few gigabytes in size). Trusted drives that do not offer Host services or that offer only a few specific Host services may allocate a small hidden partition (as small as a kilobyte, for instance).

The disc drive or storage subsystem is then initialized with an Administration SP Object and a Controller SP Object (step 310). The Administration SP Object provides access control over the creation, modification and deletion of other SP Objects. In the factory, the particular version of the trusted drive installs a default means of logging into the Administration SP. Once the Administration SP Object is initialized, an authorized agent logs into the Administration SP (step 312), and initializes the Controller SP Object with its own access controls (step 314). At this point, it is possible to deny the Administration SP a right to access, modify, or delete the Controller SP. Specifically authorized agents can then run testing, diagnostics, and maintenance programs on the controller (step 316).

Ideally, since the factory devices are on an internal factory network, testing can be enabled using the security features of the trusted drive. Specifically, testing is enabled using cryptographic keys stored securely on a secure factory server. A handful of trusted drives can be used to secure the factory keys from threats. Either a Microsoft CSP SP, a PKCS#11 SP, or an ISO 7816 SP can provide the security.

In general, the Controller SP may be provided with access controls adapted to allow the controller to upload new firmware in the field, to run diagnostics, and to run maintenance programs. For example, if there are original equipment manufacturers (OEMs) with customer-specific diagnostics, a specific customer can be assigned its own passcode to access the diagnostics. The access permissions for this customer may also enable the customer to change the passcode, to remove the passcode, or to add cryptographic permission for his diagnostics. The customer can even set up the Controller SP so that no agent other than the customer can change the customer's access to his particular diagnostics.

In one embodiment, the storage media may be partitioned with a hidden portion and a data storage portion. In another embodiment, the storage media may be partitioned with multiple hidden portions and one or more data storage portions. In this embodiment, an SP Object may be associated with a specific storage location on a physical or logical storage device. Specifically, each SP Object is associated with its own logical partition, which is not available to the OS except through authenticated access to the trusted drive firmware on the storage controller.

Figure 4:
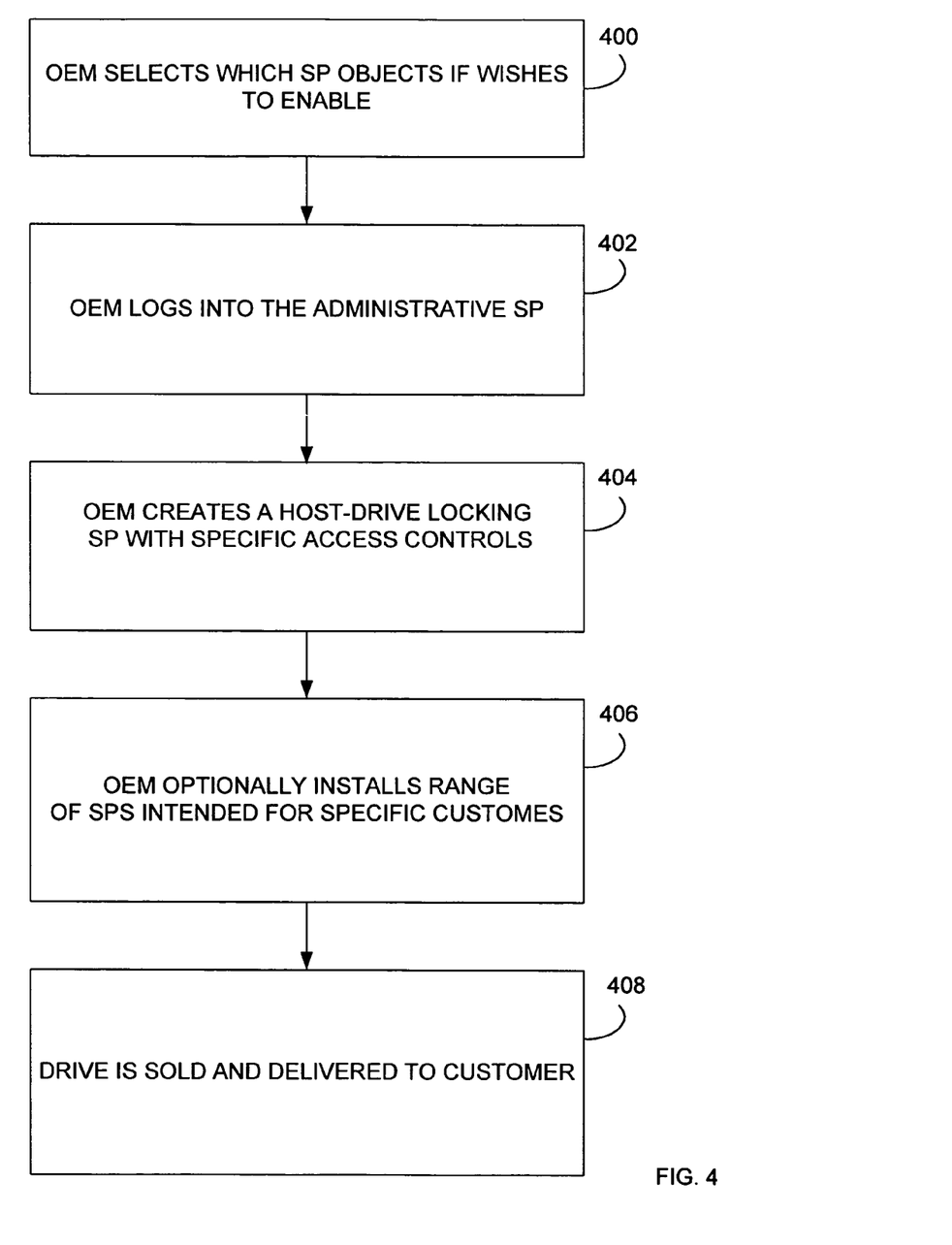
FIG. 4 is a simplified flow diagram of a customization process provided by an original equipment manufacturer in order to customize security features of the drive for a particular customer.

FIG. 4 illustrates a simplified flow diagram of the OEM process. As shown, in order to integrate a trusted disc drive or storage subsystem into a platform, the OEM selects which SP Objects it additionally wishes to enable (step 400). For example, on some Trusted drives, there is an SP Objected adapted to provide Host-Drive locking for a storage-enabled television set or a game controller. In this instance, the OEM logs into the Administration SP (step 402). The OEM then creates a Host-Drive locking SP with specific access controls (step 404). The access controls allow only the OEM or his authorized agents to unlock the drive from the host. The OEM may also install ranges of SPs intended for specific customer (step 406). For example, the OEM may install PKCS#11 SPs for server customers and Microsoft CSP SPs for its desktop customers. The OEM can then sell the drive and deliver the drive to the customer (step 408) either as a storage subsystem or as part of a system, depending on the specific implementation.

The access controls established by the OEM can be frozen so that downstream customers cannot change or modify the features provided. Alternatively, the OEM may allow some of the access controls to be modified further by a downstream customer.

In general, it will be understood by workers skilled in the art that the potential number of security providers is without limit. In that regard, the drives or storage subsystems may be assembled and configured with multiple SPs according to the needs of the specific company or customer for whom the drives are intended. For example, a company may be provided with a Checkpoint Virtual Private Network SP, a Microsoft CSP SP, a Lotus Notes SP, and a Netscape SP, which can be installed on all platforms delivered to that company. Each SP object can be installed at the factory, or at a later time by the OEM, into one or more hidden partitions on the drive. Each SP template can be stored in a different hidden partition, or they may be stored in a single hidden partition.

An Information Technology (IT) manager can configure the trusted drives or subsystems with additional host security facilities. For example, the IT manager can place specific firewall capabilities on some platforms and may choose to specifically harden access to keystores utilized in his particular public key infrastructure. He may also choose to deeply hide password banks that provide access to key company resources. Since the SP Objects are easy to create and manage using familiar database tools, such security measures can be implemented easily. Moreover, the IT manager can provide whole disc encryption where the encryption keys are kept on high security servers.

For an end user such as a home computer user, the drive is provided with an SP application for accessing and enabling or disabling SP objects. The application can, for example, show that the drive includes a "RealNetworks" SP for a company such as RealNetworks, Inc. of Seattle, Wash. (which allows for multimedia file downloads from its web site), offers a discount on audio and video downloads. The end user can then turn on that SP. Alternatively, if the user is a home user, he or she may disable all SPs.

If the user is a software developer, he or she may want to develop his or her own SP Object, perhaps to store some very private information such as his login information for his stock holdings. In this instance, the user may download a software development kit (SDK) from a web site from the OEM or the manufacturer. The user can then write his or her own SP instance as, for example, an instance of the standard database SP, but requiring RSA Token control for access. The user can then submit the object code to the web site for the code to be signed, and thereby authorized to create a SP Object on the Trusted drive. In this instance, the SP is host-side software that is written and installed on the Host. For security reasons, developers are not permitted to write new firmware and to upload the firmware to the Trusted drive.

Within the Trusted Drive architecture, it is possible to define a SP Object, like the Controller SP, that provides privileged access to authorized users to upload code to the controller. Thus, customers can be provided with a "Sandbox" where a Sandbox SP can safely execute scripts uploaded from the Host on a dynamic basis. A "sandbox" as it is understood in this instance is a virtual OS environment, which allows the user to upload code into random access memory to run within a confined window, thereby allowing for code debugging without permanently effecting the trusted drive. Several sandbox applications are commercially available, including Wave Systems Embassy by Wave Systems Corp. of Lee, Mass. TCPA/TCGs TPM is being developed to have this capability (optionally), and it is likely that the Trusted Windows Palladium/NGSCB architecture will incorporate a Sandbox for running arbitrary code. Such a Sandbox SDK would likely be available from third parties and not from the disc manufacturer.

Figure 5A:
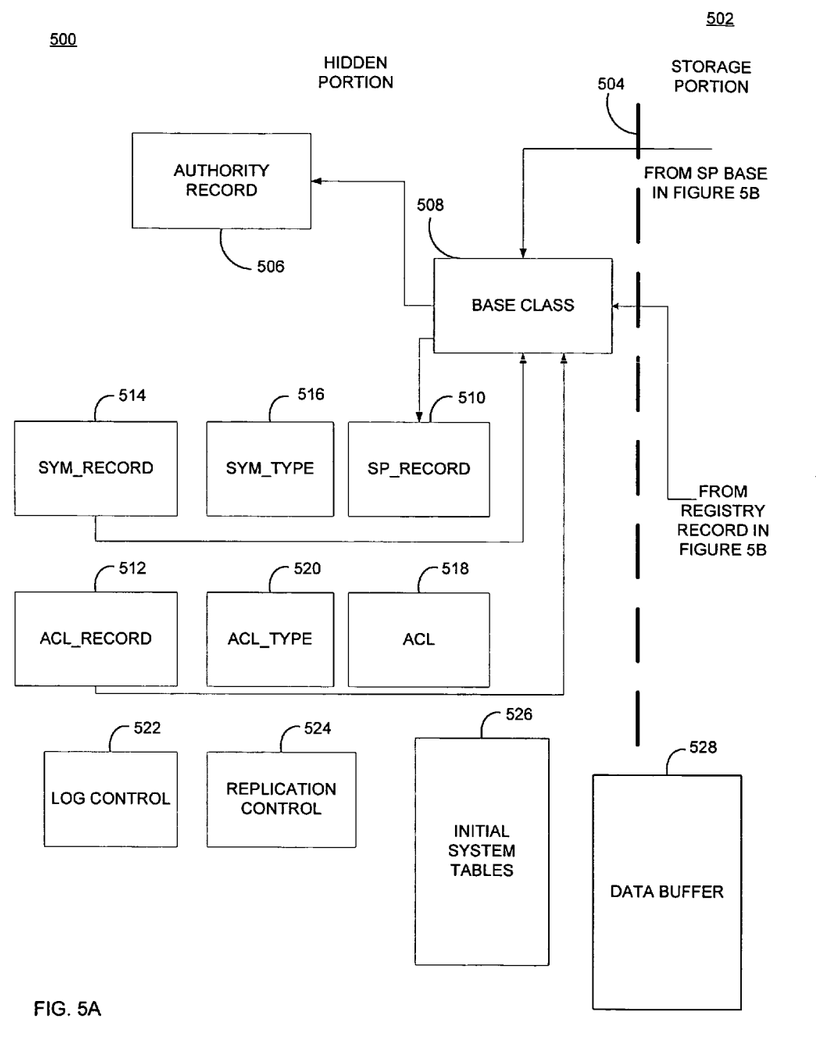
FIGS. 5A and 5B illustrate a simplified block diagram of a partitioned storage media having a hidden partition and security provider objects.
Figure 5B:
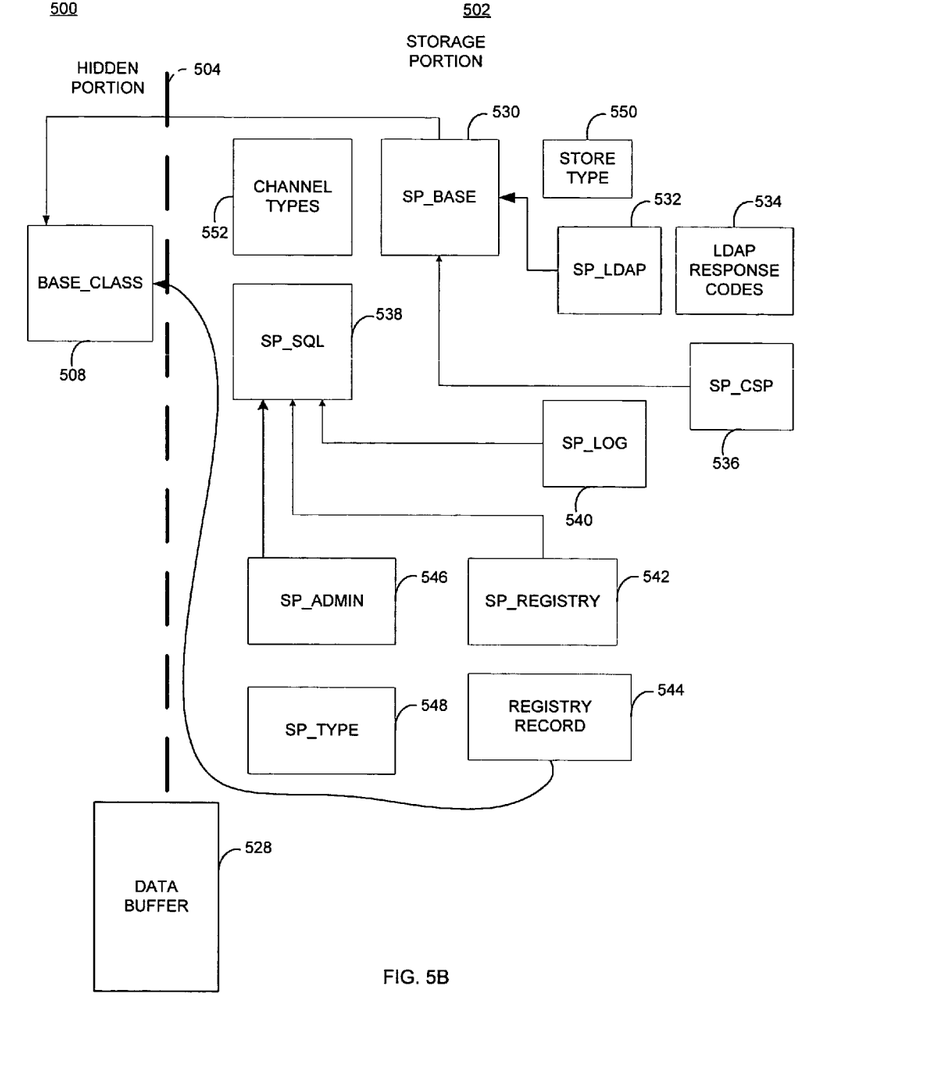

FIGS. 5A and 5B illustrate a simplified block diagram of trusted drive implementation according to an embodiment of the present invention. In FIG. 5A, the hidden portion 500 of the storage media, the main portion 502 of the storage media and the partition 504 separating them are shown.

In the embodiment shown, objects stored in the hidden partition portion 500 of the storage media are illustrated, including an authority record 506 which controls access permissions to the hidden partition 500. A base class 508 is shown, which is used to instantiate the security provider record 510 and access control records 512. The symbol table records 514 defines objects of access associated with the specific security provider record 510, including a list of symbols or names of objects that can be accessed by naming them. Symbol types 516 store the types of symbols possible, including an SP, a table, a record, a column, an executable, an integer, a string, a real number, a blob, and a BigNum. The last five items are just basic data types supported by SPs. The administration SP controls access to the various SPs contained within the SP Record, and any given SP can control access to itself.

The symbol record 514 is just a table within the SP with record columns for symbols, types of symbols (stored in related symbol type 516), byte offsets into the SP (or executable), checksums for integrity checks, and an associated access control table of access control records 512 that apply to the object named by the symbol. The byte offset generally allows the byte offset to fully address the contents of the symbol in memory.

The access control 518 contains a number, a pointer to the user record called the authority record 506, and a statement of the kind of actions permitted. Each access control instantiation is stored as an ACL record 512 with an associated ACL type 520. The actions permitted by access control 518 include at least the following actions: read, write, modify, and execute.

The symbol table 514 also contains entries for log control 522 and replication control 524. In general, the log control 522 instructs a log entry to be placed on the success or failure of an access attempt. Replication control 524 instructs a replication copy of an entire SP or an entry in an SP to be made, based on a change to the data pointed to by the symbol.

Finally, initial system tables 526 are shown within the hidden portion 500. The initial system tables 526 are created by the manufacturer when the partition 504 is created. A data buffer 528 is shown overlapping the partition 504. The data buffer 528 is utilized by the controller to hold information temporarily while access rights are determined.

Turning to FIG. 5B, the storage portion 502 is shown in greater detail. As shown, the base class 508 is provided in the hidden portion 500, but is connected via a line that crosses the partition 504 to a SP base 530 within the storage portion 502. The remaining SP objects are instantiated in the storage portion 502. As shown, the SP lightweight directory access protocol (LDAP) 532 and associated LDAP response codes 534 are associated with the SP base 530. Additionally, in this embodiment, and MS CSP standard security feature 536 is provided, which is associated with the SP base 530.

An SP standard query language (SQL) object 538 links the SP Log 540, the SP registry 542 and its associated registry record 544, and the SP Administration 546. The storage portion 502 also contains a SP type object 548, a store type object 550, and a channel type object 552.

FIGS. 5A and 5B thus illustrate the two storage portions 500 and 502, containing the hidden partition objects and the remaining SP objects. Since literally thousands of companies can provide Host and Network security products, the SP Objects are designed to be independent and self-contained and are designed to utilize a common toolset.

In this embodiment, the media is pre-loaded with SP Object templates and a base class 508. The SP Objects which can then be instantiated using the base class 508 and configured utilizing the SP administration 546 to provide hardened access controls to specific objects, resources, programs, data, and the like. The SP Objects can be varying and complex, and the technique of storing a base class within the hidden portion 508, which can only be accessed by authorized users to instantiate the security provider objects, provides a flexible, versatile system for delivering and managing digital rights and privacy services from storage.

The trusted drive is initialized at the factory with the SP admin and SP controller objects, which then provides access to the drive to create SP objects, initialize them, and configure the drive to provide hardened security. The consumer, OEM, or other specifically authorized agents can then be provided with the key for accessing the administration SP in order to configure the SP Objects or to instantiate additional SP objects in order to harden security services. Only authorized users are permitted by the drive to access the protected data, and secure information is hidden from the operating system so that the drive data is protected from unauthorized access.

In general, the system and methods of the present invention provide versatile security, digital rights management, and privacy services from disc drives and storage subsystems via the storage controllers. Specifically, firmware provided in the storage controllers at the factory offers hardened security features utilizing SP Objects stored in a hidden partition on the storage media. Since the firmware controllers can only be updated by authorized users according to the Controller SPs access controls, access to the hidden partitions and to the drive itself are controlled by access controls in the firmware itself. In this manner, OEMS, IT professionals, and users are free to make use of such security features as desired, and the trusted drive features can be utilized as desired.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the versatile security system while maintaining substantially the same functionality without departing from the scope and spirit of the present invention. In addition, although the preferred embodiment described herein is directed to a system for implementing security providers in a storage system, such as those implementing the Microsoft CSP security standard or the RSA PKCS#11 security standard, it is expected that such standards will evolve and that new standards may supplant them. It will be appreciated by those skilled in the art that the teachings of the present invention can be applied to any storage system implementing trusted drive or other security standards in which a software element must be instantiated on the storage device, without departing from the scope and spirit of the present invention.

What is claimed is:

1. A method comprising:
   partitioning a storage media in a storage device into a hidden partition and a storage partition in the storage media;
   writing a base class to the hidden partition;
   instantiating a security provider base class from the base class, the security provider base class adapted to control access to the storage media;
   instantiating a security provider (SP) administration object and a SP controller object from the security provider base class;
   logging into the SP administration object;
   initializing the SP controller object using the SP administration object; and
   creating an access control record identifying an user authorized to access the SP controller object and access permissions associated with the authorized user.

2. The method of claim 1 wherein the SP controller object is initialized with access controls.

3. The method of claim 1 wherein before the step of partitioning, the method further comprising:
   assembling the storage device;
   writing firmware to a controller; and
   powering up the drive.

4. The method of claim 1 wherein the security provider object is a cryptographic security provider.

5. The method of claim 1 wherein the storage device is a disc drive.

6. A method comprising:
   partitioning a storage media in the storage device into a hidden partition and a storage partition in the storage media;
   writing a base class to the hidden partition;
   initializing more than one security provider base class from the base class, each security provider base class adapted to control access to a specific storage location on the storage media
   creating an access control record identifying a user authorized to access a security provider controller object; and
   creating access permissions within the access control record associated with the specific storage location on the storage media, the access permissions adapted to control access to the specific storage location.

7. A method comprising:
   writing trusted drive firmware to a controller of a storage device;
   partitioning a storage media of the storage device into a hidden portion and a data portion;
   writing a security provider object template to the hidden partition; and
   instantiating security providers using the security provider object template, each security provider adapted to control access to the storage device; and
   prohibiting access by a host operating system to the storage device except through authenticated access to the trusted drive firmware of the controller.

8. The method of claim 7 and further comprising:
   instantiating an administration security provider object and a security provider controller object from the security provider object template.

9. The method of claim 8 wherein the step of initializing comprises:
   logging in to the administration security provider object; and
   initializing the security provider controller object with access controls using the administration security provider object.

10. The method of claim 8 wherein the administration security provider object has one or more authority records stored in the hidden partition, each authority record having an associated data set, the method further comprising:
    controlling access to the storage media according to the one or more authority records.

11. The method of claim 10 wherein each object stored on the storage media is associated with a security provider, and wherein the step of controlling further comprises:
    controlling access permissions to objects stored on the storage media according to the associated security provider.

12. A method comprising:
    writing trusted drive firmware to a controller of a storage device;
    partitioning a storage media of the storage device into a hidden portion and a data portion;
    writing a security provider object template to the hidden partition;
    instantiating security providers using the security provider object template, each security provider adapted to control access to the storage device;
    receiving an access request from for access to data stored on the storage device;
    querying a requesting device for trust information;
    determining whether the requesting device can be trusted using the trusted drive firmware and an instantiation of the security provider object template; and
    permitting storage controller access to a specific storage location when the requesting device can be trusted.

13. A storage device comprising:
    a storage media partitioned into a hidden portion and a data portion;
    a storage controller adapted to control access to the storage media;
    a trusted drive feature stored in a firmware of the storage controller, the trusted drive feature adapted to authenticate access requests to determine whether each access request can be trusted;
    a security provider base object stored in the hidden portion and adapted to cooperate with the trusted drive feature to control access rights to data on the storage media; and a security protected log adapted to track and log the activity of other security providers based on successes and failures to gain access to data controlled by the other security provider.

14. The storage device of claim 13, and further comprising: one or more instantiated security providers stored in the hidden portion of the storage media, each instantiated security provider associated with a particular area on the storage media.

15. The storage device of claim 14 wherein the security provider base is invoked to create a security provider administration object and a security provider controller object, the security provider administration object is adapted to configure associated security provider objects, the security provider controller object is adapted to control access to a particular area on the storage media.

16. The storage device of claim 13 and further comprising: a public key store adapted to cryptographically verify a request for a new security provider instantiation.

17. The storage device of claim 13 and further comprising: a key and passcode revocation store adapted to check keys, passcodes, or other authenticators for revocation.

18. The storage device of claim 13 and further comprising: a registry security provider adapted to provide a standard security provider handle through which any number of physical copies of a security provider can be located and managed.

19. The storage device of claim 13 and further comprising: a clock time security provider adapted to provide a security protected clock source to other devices or to other security providers.

20. The storage device of claim 13 and further comprising: a diagnostics security provider adapted to enable security to access storage controller diagnostics.

21. The storage device of claim 13 and further comprising: a test security provider adapted to enable security to access control to storage controller testing.

22. The storage device of claim 13 and further comprising: an external code security provider adapted to harden access control to software running on the security provider.

* * * * *